United States Patent
Rinke et al.

(10) Patent No.: US 10,796,257 B2
(45) Date of Patent: Oct. 6, 2020

(54) METHOD FOR PROVIDING BUSINESS PROCESS ANALYSES

(71) Applicant: Celonis SE, Munich (DE)

(72) Inventors: Alexander Rinke, Munich (DE); Martin Klenk, Munich (DE); Bastian Nominacher, Munich (DE); Raimar Wagner, Munich (DE)

(73) Assignee: CELONIS SE, Munich (DE)

( * ) Notice: Subject to any disclaimer, the term of this patent is extended or adjusted under 35 U.S.C. 154(b) by 1128 days.

(21) Appl. No.: 15/006,732

(22) Filed: Jan. 26, 2016

(65) Prior Publication Data

US 2017/0213167 A1    Jul. 27, 2017

(51) Int. Cl.
- *G06F 16/30* (2019.01)
- *G06Q 10/06* (2012.01)
- *G06F 16/2458* (2019.01)

(52) U.S. Cl.
CPC ..... *G06Q 10/0633* (2013.01); *G06F 16/2465* (2019.01)

(58) Field of Classification Search
CPC .................................................. G06Q 10/0633
See application file for complete search history.

(56) References Cited

U.S. PATENT DOCUMENTS

| | | | | |
|---|---|---|---|---|
| 6,374,252 B1 * | 4/2002 | Althoff | ............... | G06F 16/258 |
| 8,688,499 B1 * | 4/2014 | Bose | ............... | G06Q 10/067 |
| | | | | 705/7.27 |
| 9,104,728 B2 | 8/2015 | Ngai et al. | | |
| 2008/0005093 A1 | 1/2008 | Liu et al. | | |
| 2010/0042632 A1 * | 2/2010 | Johnson | ............... | G06F 11/3476 |
| | | | | 707/725 |
| 2011/0184969 A1 | 7/2011 | Idicula et al. | | |
| 2012/0016802 A1 * | 1/2012 | Zeng | ............... | G06N 5/02 |
| | | | | 705/317 |
| 2012/0124047 A1 * | 5/2012 | Hubbard | ............... | G06F 16/332 |
| | | | | 707/737 |
| 2012/0166234 A1 | 6/2012 | Drittler et al. | | |
| 2014/0129295 A1 * | 5/2014 | Band | ............... | G06Q 10/0637 |
| | | | | 705/7.36 |
| 2014/0214897 A1 | 7/2014 | Zhu et al. | | |

(Continued)

OTHER PUBLICATIONS

Article entitled "Process Mining Tutorial", by Fluxicon, Copyright 2013.*

(Continued)

*Primary Examiner* — Mahesh H Dwivedi
(74) *Attorney, Agent, or Firm* — Myers Wolin, LLC (57) ABSTRACT

A computer-implemented method is provided for providing at least one analytics package to a process mining system, wherein the processor is provided with an event log comprising process data of business processes, the process data comprising at least one process element and the process element comprising at least one process step. The event log is stored according to a predetermined data structure comprising at least a first attribute for storing a unique identifier of the process element, a second attribute for storing an identifier of the process step, and a third attribute for storing an order of the process steps. The processor is further provided with auxiliary data and a data model, and the method comprises creating, based on the data model, at least one analytics package.

15 Claims, 4 Drawing Sheets

(56) References Cited

U.S. PATENT DOCUMENTS

| | | |
|---|---|---|
| 2014/0281748 A1 | 9/2014 | Ercegovac et al. |
| 2015/0363113 A1 | 12/2015 | Rahman et al. |
| 2016/0110426 A1 | 4/2016 | Gaza et al. |
| 2017/0169078 A1* | 6/2017 | Fradkin ............... G06F 16/2465 |

OTHER PUBLICATIONS

Article entitled "Process Mining in Practice: Comparative Study of Process Mining Software", by Verstrete, dated 2014.*

Article entitled "Process Mining Tools: A Comparative Analysis", by Ailenei, dated Aug. 2011.*

Article entitled "ProM 6 Tutorial", by Verbeek, dated Aug. 2010.*

User Guide entitled "Disco User's Guide", by Rozinat, dated Feb. 4, 2015.*

Van der Aalst, "The Process Mining: Discovery, Conformance and Enhancements of Business Processes", Springer, published Mar. 2011, pp. 1-352, The Netherands.

Third party observation filed for EP Application EP20160186719 dated Dec. 9, 2017.

W.M.P. Van Der Aalst (2011): Process Mining: Discovery, Conformance and Enhancement of Business Processes. Springer-Verlag, Berlin, 2011, ISBN 978-3-642-19344-6.

Information Systems, Data: Creation, Management and Utilization, Editor: Felix Nauman—The Process Mining Manifesto—An interview with W. v. der Aalst, May 2012, pp. 288-290.

Science direct, Computers in Industry Process, W.M.P.van der Aalst & A.J.M.M.Weijters process mining: a research agenda Apr. 2004, pp. 231-244.

Science direct, Information Systems, AALST, Business process mining: An industrial application pp. 713-732, Elsevier B.V.

Workflow Management—Models, Methods and Systems: Wil van der Aalst, Kees van Hee, MIT Press, Cambridge, MA/London, England, 2002, 368 pp., 188 figs.

Marlon Dumas, Wil M. van der Aalsi Arthur H. ter Hofstede Process-Aware Information Systems: Bridging People and Software Through Process Technology, Sep. 2005.

European Research Center for Information Systems, University of Muenster, 48149 Muenster, Germany, Available online Nov. 4, 2011.

Office Action issued by the European Patent Office for related European Patent Application 16 186 720.5, dated Jun. 15, 2018, with an English translation.

Office Action issued by the European Patent Office for related European Patent Application 16 186 721.3, dated Jun. 15, 2018, with an English translation.

Office Action issued by the European Patent Office for related European Patent Application 16 186 722.1, dated Jun. 15, 2018, with an English translation.

Elmasri et al, Fundamentals of Database Systems (Sixth Edition), Chapter 2: "Database System Concepts and Architecture," pp. 29-55, Jan. 2011.

Elmasri et al, Fundamentals of Database Systems (Sixth Edition), Chapter 19: "Algorithms for Query Processing and Optimization," pp. 679-725, Jan. 2011.

Elmasri et al, Fundamentals of Database Systems (Sixth Edition), Chapter 18: "Indexing Structures for Files," pp. 631-675, Jan. 2011.

Elmasri et al, Fundamentals of Database Systems (Sixth Edition), Chapter 4: "Basic SQL," pp. 87-114, Jan. 2011.

Elmasri et al, Fundamentals of Database Systems (Sixth Edition), Chapter 26: "Enhanced Data Models for Advanced Applications," pp. 931-991, Jan. 2011.

Third Party Observation for corresponding European Patent Application No. EP20160186720, which took place on Mar. 13, 2018, and received by an individual under 37 CFR 1.56(0(3) on Apr. 9, 2018, with machine translation.

Third Party Observation for corresponding European Patent Application No. EP20160186721, which took place on Mar. 13, 2018, and received by an individual under 37 CFR 1.56(0(3) on Apr. 10, 2018, with machine translation.

Third Party Observation for corresponding European Application No. EP20160186722, which took place on Feb. 22, 2018, and received by an individual under 37 CFR 1.56(c)(3) on Mar. 15, 2018, with machine translation.

Wil M.P. Van Der Aalst, "Process Mining: Discovering and Improving Spaghetti and Lasagna Processes", IEEE Symposium on Computational Intelligence and Data Mining (CIDM 2011), pp. 13-20, Paris, France, Apr. 2011.

* cited by examiner

```
INSERT Id, Process Step, Timestamp FROM Source_Table_1;
INSERT Id, Process Step, Timestamp FROM Source_Table_2;
INSERT Id, Process Step, Timestamp FROM Source_Table_3;
...
```

| Unique ID | Process Step | Timestamp |
|---|---|---|
| 1 | Purchase Requisition | 01.01.2012 13:05 |
| 1 | Purchase Requisition Approval | 01.01.2012 15:09 |
| 1 | Purchase Order Item | 02.01.2012 17:03 |
| 1 | Goods Receipt | 03.01.2012 13:01 |
| 1 | Invoice Receipt | 03.01.2012 15:00 |
| 1 | Payment | 03.01.2012 17:00 |
| 2 | Purchase Requisition | 05.01.2012 11:00 |
| 2 | Purchase Requisition Approval | 05.01.2012 17:00 |

METHOD FOR PROVIDING BUSINESS PROCESS ANALYSES

FIELD OF THE INVENTION

The invention relates to a method for providing, in a computer system, business process analyses to a process mining system for analyzing event logs and adjacent tables/files which contain process information.

PRIOR ART AND BACKGROUND OF THE INVENTION

To achieve business goals, most companies and institution have predefined business processes which have to be followed by the employees. These processes are designed in a way to be carried out which reaches the defined goals in an efficient way, thus adherence to these processes is vital to the companies' efficiency. Unfortunately, monitoring and analyzing processes and checking for irregularities can be time consuming and complex. To overcome this, process mining systems help to analyze the as-is processes.

Most tasks which are reflecting steps on the way of the process are conducted in an IT driven environment and leave traces in an IT system. Picking up these traces and reconstructing the as-is process from this data is the goal of process mining.

From a business process perspective a process involves the following process components:

- A processed element which is passing through the process. Examples are an invoice which has to be cleared or a patient who has to be treated in a hospital.
- Process steps which are conducted with the process element. Examples would be "Invoice is received" or "Registration of the patient in the emergency room."
- An order of process steps which are conducted with the process element. Examples would be that in a patient treatment process the patient is first treated before the bill is sent to the insurance company.

In order to reconstruct the as-is processes by process mining systems at least one event log has to be provided to the process mining systems. Unfortunately almost no IT-system is prepared in a way that such an event log can be retrieved immediately from the raw data comprising the traces of executed processes. With such an event log the technical requirements are fulfilled to apply process mining techniques.

To address business process questions, the technical representation as an event log combined with process mining techniques at its own is mostly not sufficient for an end user in the role of a business process professional. Such a user requires a non-technical approach a process mining system with prepared analyses based on both event log and adjacent tables/files which contain process information.

Object of the Invention

It is an object of the invention to provide analytics packages to answer business related process questions. These packages are built upon an event log, further tables and a data model within a process mining system. They allow non-technical users to approach business process questions within a process mining system.

Solution According to the Invention

This object is solved according to the invention by a method as well as a system according to the independent claims. Preferred embodiments and further developments of the invention are specified in the respective dependent claims.

In one aspect of the invention, a method for providing at least one analytics package to a process mining system is provided, wherein the analytics package provides analyses of business processes to a user of the process mining system, wherein the method is executed in a computer system having a processor and a storage means operatively coupled to the processor, and wherein the method comprises (a) providing at least one event log to the processor, the event log comprising process data of the business processes, the process data being derived from raw data stored in a source system, wherein the process data comprise at least one process element and the at least one process element comprises at least one process step, the event log being stored with the storage means according to a predetermined data structure, the predetermined data structure comprising at least
   a first attribute for storing a unique identifier of the process element of the respective process step,
   a second attribute for storing an identifier of the respective process step, and
   a third attribute for storing an order of the process steps within the process element;
(b) providing auxiliary data to the processor, the auxiliary data being stored in a set of tables and/or files, where the auxiliary data belong to the event log;
(c) providing a data model to the processor, the data model describing the predetermined data structure, the set of tables and/or files and the relations between the tables and/or files and the predetermined data structure; and
(d) creating, based on the data model, the at least one analytics package, the at least one analytics package comprising executable program modules for
   creating and displaying at least one graphical analysis of the process data stored with the event log and/or of the auxiliary data stored with the set of tables and/or files, and/or
   creating and displaying at least one graphical representation of the process data stored with the event log.

The at least one graphical analysis may comprise plots, charts and/or tables of the data stored with the event log and/or of the auxiliary data stored with the set of tables and/or files.

The at least one graphical representation may comprise a directed graph which represents the process flow of the process data or of a subset of the process data stored with the event log.

The analytics package may be pre-configured for the process mining system.

The analytics package may be pre-configured for a specific event log and the corresponding set of tables and/or files, or for a specific set of event logs and the corresponding set of tables and/or files.

Advantageously, a set of parameters may be assigned to the at least one analytics package, wherein the values of the parameters control the behavior of the analytics package when executed by the processor.

The parameters are used to fit the analytics package to different event logs and/or variants of the set of tables and/or files.

Further, the analytics package may be adapted
   to drill down into different features of the data model, and/or
   to filter the event log and/or the set of tables and/or files with respect to predetermined filter criteria.

The predetermined filter criteria may be derived from the data model.

The at least one analytics package may be provided to a package store for being downloaded by the user of the process mining system.

Further, the package store may provide functionality to the user of the process mining system to
purchase existing analytics packages, and/or
sell and distribute own analytics packages, and/or
rate and comment existing analytics packages, and/or
search for analytics packages.

Furthermore, an event log package may be provided to the processor, the event log package comprising at least one process sensor, wherein the at least one process sensor is adapted
to derive the process data from the raw data, and
to generate from the derived process data
the unique identifiers of process elements,
the identifiers of process steps which are assigned to the process elements, and
the order of the process steps,
wherein the at least one process sensor is executed by the processor and wherein the processor stores the generated data as the event log with the storage means according to the predetermined data structure.

The order of the process step may comprise at least one of timestamp and time interval.

The at least one process sensor may comprise at least one sensor statement, wherein the at least one process sensor is executed by executing at least one sensor statement of the at least one process sensor.

The at least one process sensor may be adapted to create the set of tables and/or files.

The at least one process sensor may be adapted
to generate from the raw data and/or from the derived process data the auxiliary data, and
to store the auxiliary data with the tables and/or files.

The relationship between the event log package and the analytics package is a one-to-many relationship, wherein the execution of the program modules of the analytics package on the process mining system depends on whether the corresponding event log package is available on the process mining system.

Further provided is an analytics package for providing analyses of business processes to a user of a process mining system, the analytics package comprising executable program modules for
creating and displaying at least one graphical analysis of process data stored with an event log and/or of auxiliary data stored with a set of tables and/or files, and/or
creating and displaying at least one graphical representation of the process data stored with the event log,
wherein the process data describes the business processes,
wherein the auxiliary data belong to the event log, and
wherein the event log is stored with a storage means according to a predetermined data structure, the predetermined data structure comprising at least
a first attribute for storing a unique identifier of a process element of a process step of the process data,
a second attribute for storing an identifier of the process step assigned to the process element, and
a third attribute for storing an order of the process steps within the process element.

Furthermore, a computer program product is provided comprising a computer readable storage means, on which computer readable instructions are stored, which, if executed in a processor of a computer, instruct the processor of the computer to execute the inventive method for providing at least one analytics package to a process mining system, wherein the processor is coupled to a second storage means operatively, wherein an event log is stored with the second storage means.

Yet further, a computer-based system is provided, comprising:
a processor,
a storage means being operatively coupled to the processor, for storing an event log according to a predetermined data structure and auxiliary data which belong to the event log, and
a computer readable storage medium being operatively coupled to the processor, wherein instructions are stored on the computer readable storage medium, which, when executed by the processor of the system, instruct the processor of the system to execute a method according to claim 1 for providing at least one analytics package to a process mining system.

BRIEF DESCRIPTION OF THE FIGURES

Details and features of the invention as well as specific embodiments of the invention can be derived from the subsequent description in connection with the drawing, in which.

DETAILED DESCRIPTION OF THE INVENTION

The analysis of business process by a process mining application is for the most part conducted in two stages:
In the first stage the raw data from the IT source system is transformed into a representation which is capable for process mining applications. This transformation is conducted by process sensors which are part of an event log package.
The second stage involves the usage of the event log to address business process questions. Since the raw event log from the event log package is not capable of addressing business process questions on its own further analytics packages are stacked on top of the event log package. These may contain prepared analyses which are built on top of an event log package and contain insights for non-technical business process professionals. This package and its components resemble the object of invention.

Figure 1:
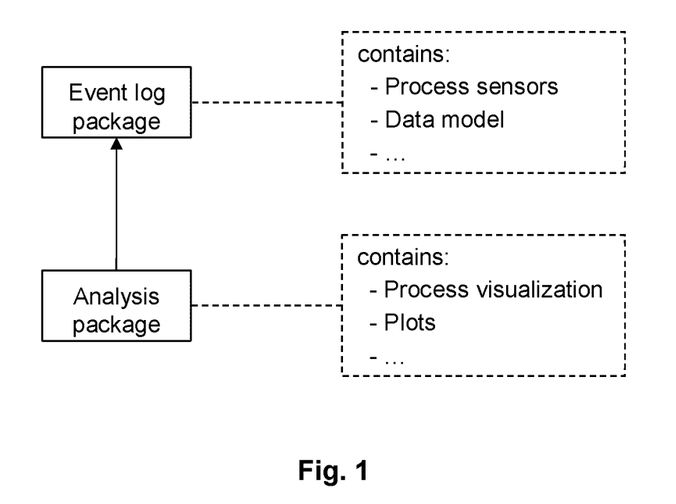
FIG. 1 shows the relation of an event log package to an analytics package.

The relation and the content of both the event log package and the analytics package are depicted in FIG. 1.

Event Log Package

The above-mentioned process components are mapped to technical representations within the source system by executing one or more process sensors. Based on the technical representations the process can be reconstructed solely from the traces which have been left on the source system.

The mapped representations are:
- A unique identifier for the process element. This identifier relates to the element which is being processed.
- A set of process steps which a process element can pass during its process. Not every step has to be fulfilled by the process element.
- The order of the process steps. If every process step has a timestamp (or even a time span) attached to the process step, not only can the order of the steps be reconstructed but also specific time differences between different process steps can be determined.

These technical components (i.e. the mapped representations) lead then to a data structure of an event log which is the input for process mining systems. The creation of the data structure is performed by the process sensors.

Thus, a process sensor is adapted to derive process data from the raw data comprising the digital traces of the executed processes, and to generate from the derived process data the event log.

The data structure consists in the simplest structure of three columns which reflect the aforementioned process components:
- an unique ID,
- a process step, and
- an order of the process steps.

The order may be an attribute that allows sorting, preferably a single timestamp or multiple time stamps representing one or more time spans.

An example of an event log with a single timestamp is given in the following table.

| Unique ID | Process Step | Timestamp (Order) |
|---|---|---|
| 1 | Purchase Requisition | 2012-01-01 13:05 |
| 1 | Purchase Requisition Approval | 2012-01-01 15:09 |
| 1 | Purchase Order Item | 2012-01-02 17:03 |
| 1 | Goods Receipt | 2012-01-03 13:01 |
| 1 | Invoice Receipt | 2012-01-03 15:00 |
| 2 | Purchase Requisition | 2012-01-05 11:00 |
| 2 | Purchase Requisition Approval | 2012-01-05 17:00 |
| ... | | |

An example of an event log with multiple timestamps is given in the following table.

| Unique ID | Process Step | Timestamp (Start) | Timestamp (End) |
|---|---|---|---|
| 1 | Purchase Requisition | 2012-01-01 13:05 | 2012-01-01 13:15 |
| 1 | Purchase Order Item | 2012-01-02 17:03 | 2012-01-02 17:13 |
| 1 | Goods Receipt | 2012-01-03 13:01 | 2012-01-03 14:01 |
| 1 | Invoice Receipt | 2012-01-03 15:00 | 2012-01-03 15:10 |
| 2 | Purchase Requisition | 2012-01-03 15:00 | 2012-01-03 15:15 |
| 2 | Purchase Order Item | 2012-01-05 17:00 | 2012-01-05 17:10 |
| ... | | | |

Given such an event log, the as-is process can be reconstructed by process mining algorithms.

In the following, the components "Process sensor" and the "event log package" are explained in further detail.

The Component Process Sensor

A process sensor is able to sense the necessary data for a process step out of the source data, i.e., raw data stored in the source systems.

Thus, a process sensor is a unit which can be applied to the raw data of the source system to sense one or multiple process steps. The respective changes which were triggered in the raw data are then converted into the aforementioned structure of an event log. The minimal set of data which is sensed are the ones mentioned before:
- one (or multiple) process step description(s),
- one (or multiple) order attributes (e.g. timestamps/time spans) which correspond to one process step, and
- one unique ID which corresponds to a process element.

One process sensor is preferably independent of the data storage layer.

Definition of a Process Sensor

In a source system which handles processes the data is usually saved into tables which reside in a data storage, e.g. in a database system. The different data fields which are sensed by the process sensor(s) are often scattered among different tables. The relations between the different tables have to be defined within the process sensor(s).

With this requirement a process sensor S can be defined as a tuple of the data set mentioned before with a unique identifier I, a process step P, an order attribute T and further attributes V:

$$S = \langle I, P, T, V \rangle$$

This n-tuple is evaluated during the execution of the sensor S and the results consists of an event log with these columns.

The unique identifier I can further be defined as:

$$I = \langle \Delta \bowtie \ldots \bowtie \Gamma, \lambda \rangle$$

where $\Delta$ and $\Gamma$ stand for the tables containing the fields necessary for the unique identifier $\lambda$ corresponding to the process object. The unique identifier $\lambda$ can consist of any transformation of the fields contained in the consecutive join over (possibly) multiple tables from $\Delta$ to $\Gamma$.

The process step P can further be defined as:

$$P = \langle \Pi, \pi, d, \Delta \bowtie \ldots \bowtie \Gamma \bowtie \ldots \bowtie \Pi \rangle$$

where $\Pi$ corresponds to the table holding the process step description in the field $\pi$. d stands for a fixed prefix for the process step. The consecutive join over (possibly) multiple tables from the unique identifier A to the process step table $\Pi$ allows to retrieve the process step name $\Pi$ from a transformation using the fields from all joined tables.

Similar, the order T can be defined as:

$$T = \langle \Omega, \omega, \Delta \bowtie \ldots \bowtie \Gamma \bowtie \ldots \bowtie \Omega \rangle$$

where $\Omega$ corresponds to the table holding the order attribute in the field $\omega$. $\omega$ can either resemble a single value (e.g. a single timestamp) or a pair of values (e.g. timestamps to indicate start- and end time of an event). It can be retrieved from any transformation of the fields given by all joined tables.

The further attributes V corresponds to data which can be added directly to the event log data structure or is added to a different table or file with a relation to the event log. It can also be defined as:

$$V = \langle \Sigma, \sigma, \Delta \bowtie \ldots \bowtie \Gamma \bowtie \ldots \bowtie \Sigma \rangle$$

where $\Sigma$ corresponds to the table holding the additional attributes in the field $\sigma$. $\sigma$ must not only be a fixed field but can also be the result of a transformation which is based on the fields given by all joined tables.

Configuration of a Process Sensor

Since not every detail in the source systems is the same, process sensors can be configured. Every process sensor can have multiple parameters which can be adjusted. These adjustments are later necessary when creating an event log.

The configuration provides a set of value for parameters which were predefined in the process sensors. These values are then subsequently replaced in the process sensors, thus the sensors are then configured for a particular working environment.

Beside the simple configuration with a search/replace technique the process sensor also provides more complex configuration options to:
- define conditions for the execution of different parts of the process sensors. These conditioned executions can then be controlled by the configurations parameters.
- define loops and multiple executions of parts of the process sensors.

The process sensor also provides the possibility to maintain variables which can be set in first process sensor and affect the execution of at least a second sensor.

With these configuration options complex use cases can be configured.

Execution of One or Multiple Process Sensors

In the following the creation of an event log is described in further detail.

Figure 4:
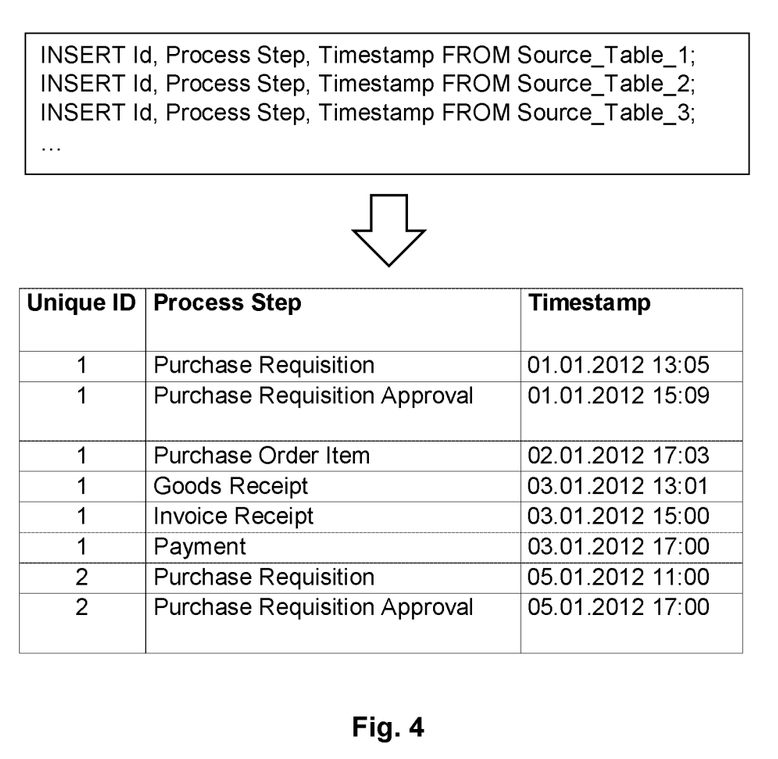
FIG. 4 shows an execution scheme of a script to create an event log.

The above-described components allow the creation of an event log based on a set of process sensors. In a common approach the event log can be created by a monolithic sequence of data query language commands (mostly SQL-Script). Such a schema is shown in FIG. 4 where a set of SQL-commands generate creates the event log.

Figure 5:
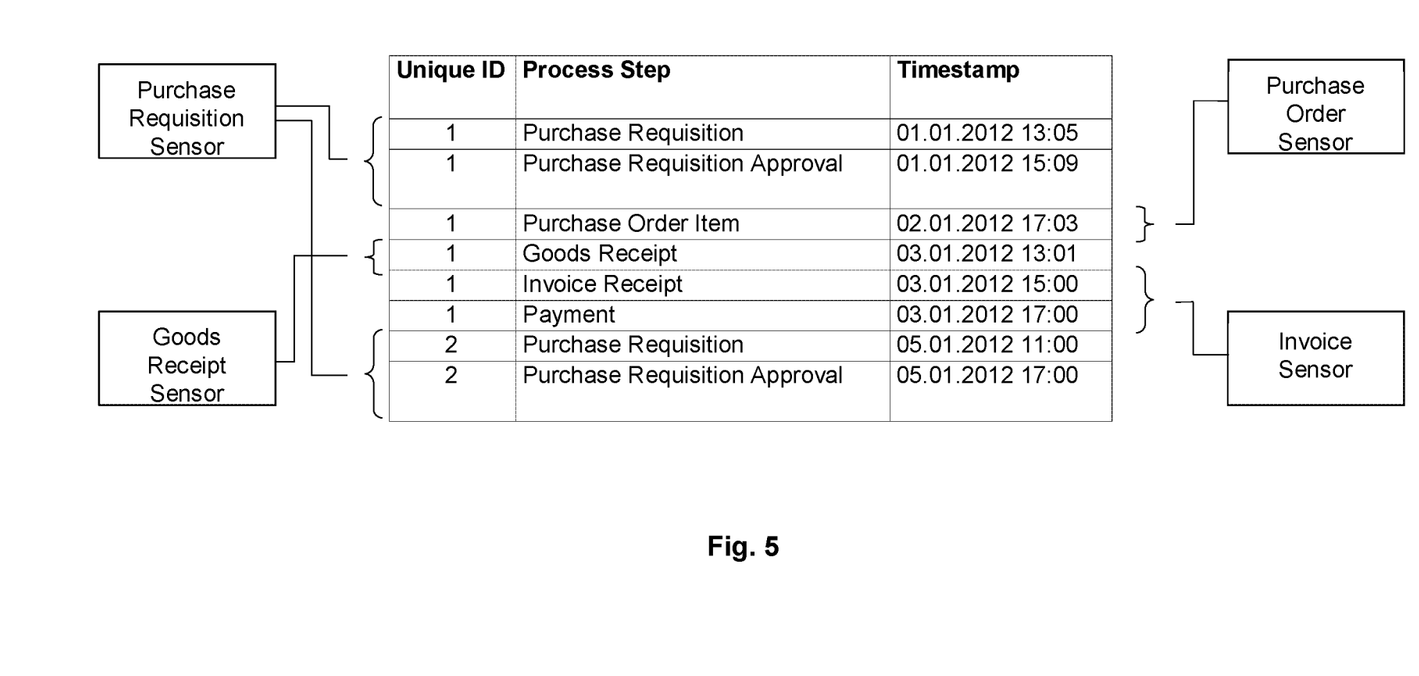
FIG. 5 shows an example event log which is created by executing a number of process sensors.

Multiple different process sensors can be used in order to generate a complete event log. In this case each process sensor senses a subset of process steps and therefore contributes its steps to the complete event log. FIG. 5 shows this behavior as an example, where different parts of the event log are generated by different process sensors.

This enables to combine multiple process sensors in a modular fashion where each event log line can be the result of a different process sensor. The user then specifies the parameter settings to configure the execution of the process steps. This configuration is then applied to all process sensors. Furthermore, the user has to provide a data representation scheme (e.g. a database) where the source system data (i.e. the raw data) can be sensed. Then the sensors pick up the process steps and forms the event log. This sensing can not only be carried out in a one-way fashion but also in a scheduled manner. Thus, the sensing may for example take place every day at a fixed point in time.

After the sensing of the digital traces which leads to the event log data structure the foundation for applying process mining algorithms are laid out.

Development Framework

While the preconfigured process sensors are set up for an immediate usage by a non-expert user, an extensive development framework is also provided. This framework supports both interaction by a scripting language and with a graphical user interface.

The creation of the process sensors with all elements mentioned before can either be carried out in a scripted/programmed fashion or through a graphical user interface.

In the scripted interface the relations, source tables, target tables and other attributes are scripted in a programming language.

Besides the scripted/programmed interface a graphical user interface is provided to create process sensors solely via a graphical interface. The interface provides an overview over all tables where the user can then choose by mouse operations which fields and relations are resembling the process sensor.

Both, the scripted and the graphical user interface are independent from an underlying execution environment. From the graphical user interface input as well as from the scripted programming language the executable code for the underlying execution platform is generated during runtime.

The Component Event Log Package

Figure 2:
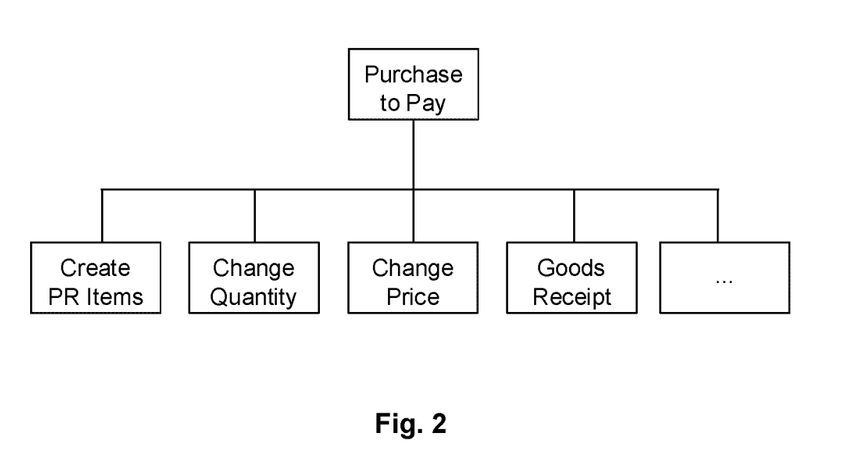
FIG. 2 shows a number of process sensors of an example event log package.

One event log process package contains all process sensors which are necessary for the analysis of one or more specific business processes. Business processes consist of multiple process steps which cannot necessarily be combined into one process sensor. To account for multiple sensors, multiple process sensors can be combined within one event log process package. An example of an event log process package is depicted in FIG. 2. In this example "Purchase to Pay" represents the event log package and "Create PR Items", "Change Quantity", "Change Price" and "Goods Receipt" represent the process sensors of the event log package "Purchase to Pay".

The process sensors itself only sense the process data and create the event log data structure. Based on this data structure process mining is already possible.

Besides the event log as a process mining capable data structure the package also contains a data model which describes the structure of all elements which have been created by the packages process sensors. This data model must not only contain data structures created by the process sensors but also additional tables which have been linked to the event log.

Examples of Process Sensors

In the following two examples for process sensors are given: one simple process sensor (Invoice paid sensor) and one complex sensor (Change of content sensor).

1. Invoice Paid Sensor

The "Invoice paid sensor" senses the process step when an invoice has been paid in an ERP-system. To sense this process step all invoices are considered and as soon as an invoice has a valid date in the field "clear date" this process step is successfully sensed. The data which is then sent to the event log is:
- the invoice ID as the unique ID,
- the "clear date" field content as the timestamp of the process step, and
- the process step description, where the process step description may be fixed with "Invoice paid".

Assuming this invoice paid sensor is used in a standard SAP FI environment, the above-mentioned formal definition $\langle I, P, T, V \rangle$ would be:

$$I = \langle \Delta, \lambda \rangle = \langle BSEG, \{MANDT, BUKRS, BELNR, GJAHR, BUZEI\} \rangle$$

$$P = \langle \Pi, \pi, d, \Delta \bowtie \ldots \bowtie \Pi \rangle = \langle BSEG, -, \text{"Invoice paid"}, - \rangle$$

$$T = \langle \Omega, \omega, \Delta \bowtie \ldots \bowtie \Omega \rangle = \langle BSEG, AUGDT, - \rangle$$

$$V = -$$

Since all fields are within the same table (BSEG) no joins were needed. The resulting output would then look like this:

| Unique ID | Process Step | Timestamp (Order) |
| --- | --- | --- |
| 1 | Invoice paid | 2012-01-01 |
| 2 | Invoice paid | 2012-01-01 |
| ... | | |

2. Change of Content Sensor

The "Change of content sensor" senses all process steps which belong to a change of the content of an invoice. All fields which are analysed by the source system in change logs can then be used as a change process step. The data which is sent to the event log is:
- the invoice ID as the unique ID,
- the "change date" of the respective field as timestamp of the process step, and
- the process step description—in this example the process step description is defined by the prefix "Change of:" and the fieldname which was changed. For example: "Change of: invoice amount".

Assuming this invoice paid sensor is used in a standard SAP FI environment the formal definition $\langle I, P, T, V \rangle$ would be:

$$I = \langle \Delta, \lambda \rangle = \langle BSEG, \{MANDT, BUKRS, BELNR, GJAHR, BUZEI\} \rangle$$

$$P = \langle \Pi, \pi, d, \Delta \bowtie \ldots \bowtie \Pi \rangle = \langle CDPOS, FNAME, \text{"Change of:"}, BSEG \bowtie CDPOS \rangle$$

$$T = \langle \Omega, \omega, \Delta \bowtie \ldots \bowtie \Omega \rangle = \langle CDHDR, UDATE, BSEG \bowtie CDPOS \bowtie CDHDR \rangle$$

$$V = \_$$

In this more complex process sensor three tables are involved: the invoice table "BSEG" and two change log tables "CDPOS" and "CDHDR". Since the unique ID is retrieved from the invoice table "BSEG", the process step from the table "CDPOS" and the timestamp from the table "CDHDR" these three tables have to be related within this process sensor.

The resulting output would then look like this:

| Unique ID | Process Step | Timestamp (Order) |
|---|---|---|
| 1 | Change of: ERNAM | 2012-03-01 |
| 2 | Change of: ZLSPR | 2012-04-01 |
| ... | | |

Analytics Package

To answer business process questions the event log and the further tables are not sufficient. The business process professional requires a non-technical way to approach a process mining system. To bridge the gap from the technical event log to business process perspective the analysis package provides prepared analyses to the end user.

The Component Analytics Package

Based upon the process event log and the data model as a description of the process event log an analytics package is defined as a set of:
- Plots, charts and tables based on process event log data
- Directed graphs which show the process flow for the current selection
- Describing text and graphic components Such an analytics package may be pre-configured for a process mining system to give an insight into a specific business process. The perspective of the view on the process is defined in such a way, that a particular business process question is tackled and the analytics package is therefore useful for a process professional.

Each analytics package has the following further properties:
- The analytics package is customizable with parameters to fit different event log and table variants.
- The analytics package is able to drill down onto different features from the configured data model.

Relation to the Event Log Package

Since all non-static components of the analytics package (e.g. plots, charts, process visualization) require data to be displayed, each analytics package is built on top of an event log package. The event log package provides by the means of a data model a comprehensive description of the event log and all connected tables. Since each event log package can contain information for multiple analytics packages the relation between the event log package and the analytics package is one (event log package) to multiple (analytics package). On the other hand, an analytics package can only be operated when the specified event log package is present. FIG. 1 shows the relation of an event log package to an analytics packages.

Analytics Package Examples

Two examples for analytics packages are given here for the "Purchase-to-Pay" (P2P) Process: A throughput time analytics package and a process conformance analytics package.

1. Purchase to Pay Throughput Time Analytics Package

This analytics package gives the process professional the opportunity to determine the time which has passed between two process steps. It contains:
- A process graph visualization which shows all process steps as nodes in a directed graph.
- On the edges of the process graph the average time between consecutive process steps.
- The possibility to choose two process steps for which the average throughput time is shown over various axes. These axes can be:
  Company code
  Purchasing group
  Plant
  ...
- The average throughput time between these two process steps is shown over time as a line plot.

With this analytics package the process professional is able to:
- Determine parts of the process which take most of the process throughput time
- Identify parts of his organization (company codes, purchasing groups ...) which are outlier with respect to the average throughput time.
- Check if the throughput time, after counter measures against delays were conducted, has shorten.

2. Purchase to Pay Process Conformance Analysis

This analytics package gives a process professional the opportunity to analyze the process conformance of the purchase to pay process. It contains:
- A process graph visualization which shows all process steps as nodes in a directed graph.
- The edges of the process graph are colored green if the process step is conform to the defined process and red if this step was not designated to be part of this process.
- The possibility to show the average percentage of cases being conform to the defined process. These axes can be:
  Company code
  Purchasing group
  Plant
  ...
- The average percentage of cases being conform shown over time as a line plot.

With this analytics package the process professional is able to:

Identify parts of his organization (company codes, purchasing groups . . . ) which are outlier with respect to the percentage of non-conform process cases.

Monitor if, after counter measures were applied against process violations, the average percentage of non-conform cases is decreasing.

Package Store

Figure 3:
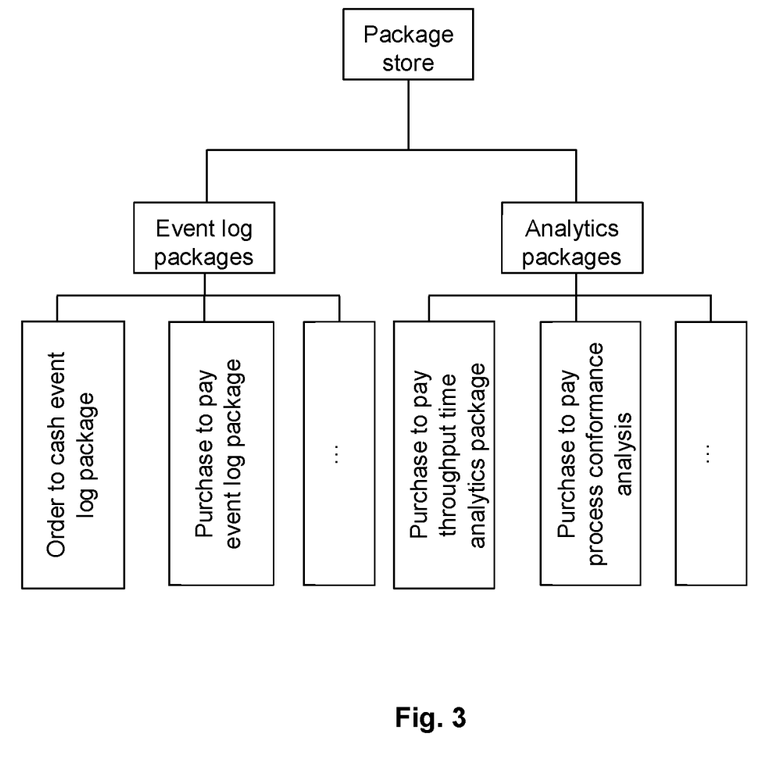
FIG. 3 shows a number of event log packages and analytics packages within a package store.

The package store (shown in FIG. 3) resembles a platform which acts as a single entry point to retrieve both event log and analytics packages for the user's process mining application. Since the event log packages provides the necessary technical foundation for the analytics package, one can:

Purchase and retrieve existing event log packages which allow the usage of analytics package for the specific process.

Sell and distribute own event log packages to other users of the platform.

Rate and comment on existing event log packages.

Search for event log packages.

To make use of the event log packages for the business process professional with analytics packages, one can use the platform to:

Purchase and retrieve existing packages from the package store. If the event log package has not been previously retrieved the event log package must be retrieved beforehand.

Sell and distribute own packages to other users of the platform.

Rate and comment on existing packages

Search for packages

The invention can be implemented in digital electronic circuitry, or in computer hardware, firmware, software, or in combinations of them. The invention can be implemented as a computer program product, that is, a computer program tangibly embodied in an information carrier, for example, in a machine-readable storage device or in a propagated signal, for execution by, or to control the operation of, data processing apparatus, for example, a programmable processor, a computer, portable computer, smartphone, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. Information carriers suitable for embodying computer program instructions and data include all forms of non-volatile memory, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in special purpose logic circuitry. The data can be stored in a database management system, e.g. a relational database management system, object oriented database management system, or hierarchical database management system.

The invention can be implemented in a computing system that includes a back-end component, for example, as a data server, or that includes a middleware component, for example, an application server, or that includes a front-end component, for example, a client computer having a graphical user interface or a Web browser through which a user can interact with an implementation of the invention, or any combination of such back-end, middleware, or front-end components. The components of the system can be interconnected by any form or medium of digital data communication, for example, a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. Accordingly, other embodiments are within the scope of the following claims.

We claim:

1. A computer-implemented method for providing at least one analytics package to a process mining system, wherein the analytics package provides analyses of business processes to a user of the process mining system, wherein the method is executed in a computer system having a processor and a memory device operatively coupled to the processor, and wherein the method comprises (a) providing at least one event log to the processor, the event log comprising process data of the business processes, the process data being derived from raw data stored in a source system comprising at least one data table of a database system, wherein the process data comprise at least one process element and the at least one process element comprises at least one process step, the event log being stored with the memory device according to a predetermined data structure, the predetermined data structure comprising at least a first attribute for storing a unique identifier of the process element of the respective process step, a second attribute for storing an identifier of the respective process step, and a third attribute for storing an order of the process steps within the process element;

(b) providing auxiliary data to the processor, the auxiliary data being stored in a set of tables, where the auxiliary data belong to the event log;

(c) providing a data model to the processor, the data model describing the predetermined data structure, the set of tables and the relations between the tables and the predetermined data structure; and (d) creating, based on the data model, the at least one analytics package, the at least one analytics package comprising executable program modules for creating and displaying at least one graphical analysis of the process data stored with the event log and of the auxiliary data stored with the set of tables;

wherein the method further comprises providing an event log package to the processor, the event log package comprising at least one process sensor, wherein the at least one process sensor
derives the process data from the raw data, and
generates from the derived process data
the unique identifiers of process elements,
the identifiers of process steps which are assigned to the process elements, and
the order of the process steps,
wherein the at least one process sensor is executed by the processor and wherein the processor stores the generated data as the event log with the memory device according to the predetermined data structure, and wherein the relationship between the event log packages and the analytics package is a one-to-many relationship and wherein the execution of the program modules of the analytics package on the process mining system depends on whether the corresponding event log package is available on the process mining system.

2. The method of claim 1, wherein the at least one graphical analysis comprises plots, charts and/or tables of the data stored with the event log and/or of the auxiliary data stored with the set of tables.

3. The method of claim 1, wherein the at least one graphical representation comprises a directed graph which represents the process flow of the process data or of a subset of the process data stored with the event log.

4. The method of claim 1, wherein the analytics package is pre-configured for the process mining system.

5. The method of claim 1, wherein the analytics package is pre-configured for a specific event log and the corresponding set of tables, or for a specific set of event logs and the corresponding set of tables.

6. The method of claim 1, wherein a set of parameters is assigned to the at least one analytics package, wherein the values of the parameters control the behavior of the analytics package when executed by the processor.

7. The method of claim 6, wherein the parameters are used to fit the analytics package to different event logs and/or variants of the set of tables.

8. The method of claim 1, wherein the analytics package is adapted
to drill down into different features of the data model, and/or
to filter the event log and/or the set of tables with respect to predetermined filter criteria.

9. The method of claim 8, wherein the predetermined filter criteria are derived from the data model.

10. The method of claim 1, wherein the at least one analytics package is provided to a package store for being downloaded by the user of the process mining system.

11. The method of claim 10, wherein the package store provides functionality to the user of the process mining system to
purchase existing analytics packages, and/or
sell and distribute own analytics packages, and/or
rate and comment existing analytics packages, and/or
search for analytics packages.

12. The method of claim 1, wherein the order of the process step comprises at least one of timestamp and time interval.

13. The method of claim 1, wherein the at least one process sensor comprises at least one sensor statement and wherein the at least one process sensor is executed by executing at least one sensor statement of the at least one process sensor.

14. The method of claim 1, wherein the at least one process sensor is adapted to create the set of tables.

15. The method of claim 1, wherein the at least one process sensor is adapted
to generate from the raw data and/or from the derived process data the auxiliary data, and
to store the auxiliary data with the tables.

* * * * *